United States Patent [19]

Dhein et al.

[11] 4,029,617

[45] June 14, 1977

[54] PROCESS FOR THE PRODUCTION OF WATER-DILUTABLE BINDERS BASED ON AIR-DRYING SHORT-OIL ALKYD RESINS

[75] Inventors: Rolf Dhein; Jochen Schoeps, both of Krefeld; Johannes Beckers, Kempen; Rolf Kuchenmeister, Krefeld, all of Germany

[73] Assignee: Bayer Aktiengesellschaft, Germany

[22] Filed: Sept. 23, 1975

[21] Appl. No.: 616,070

[30] Foreign Application Priority Data

Sept. 28, 1974 Germany .................. 2446439

[52] U.S. Cl. .................. 260/20; 260/25; 260/29.2 E; 260/29.3; 428/430; 428/436
[51] Int. Cl.² .................. C09D 3/40; C09D 3/56
[58] Field of Search .................. 260/20, 25

[56] References Cited

UNITED STATES PATENTS

| | | | |
|---|---|---|---|
| 1,969,761 | 8/1934 | Rosenblum | 260/20 |
| 2,079,616 | 5/1937 | Hopkins et al. | 260/20 |
| 2,081,153 | 5/1937 | Rosenblum | 260/20 |
| 2,081,154 | 5/1937 | Rosenblum | 260/20 |
| 2,088,035 | 7/1937 | Morgan | 260/20 |
| 2,250,940 | 7/1941 | Zahn et al. | 260/20 |
| 3,752,778 | 8/1973 | Dhein et al. | 260/22 TN |
| 3,950,286 | 4/1976 | Hoenel et al. | 260/25 |

FOREIGN PATENTS OR APPLICATIONS

| | | | |
|---|---|---|---|
| 2,009,841 | 2/1970 | France | 260/22 TN |
| 1,046,014 | 10/1966 | United Kingdom | 260/22 |

OTHER PUBLICATIONS

Chemical Abstracts, vol. 72, No. 8, Feb. 23, 1970, p. 33338f.

*Primary Examiner*—Ronald W. Griffin
*Attorney, Agent, or Firm*—Connolly and Hutz

[57] ABSTRACT

A process for the production of water-dilutable binders based on air-drying short-oil alkyd resins acidified by semiester formation with dicarboxylic acid anhydrides which alkyd resins have acid numbers of from 30 to 70 and hydroxyl numbers of from 40 to 120 and a content of natural unsaturated fatty acids in an amount of from 15 to 50 % by weight and of a co-condensed natural-resin-modified phenol resol resin in an amount of from 2 to 10% by weight, characterized in that 1. the molar composition of the alkyd resin before semiester formation corresponds to a polyalcohol/polycarboxylic acid (anhydride)/monocarboxylic acid ratio of 1 : (0.5-1) : (0.3-1), and 2. polyalcohols, polycarboxylic acids resp. their anhydrides, monocarboxylic acids and phenolic resins are co-condensed in a single process stage, followed only by semiester formation with dicarboxylic acid anhydrides.

1 Claim, No Drawings

PROCESS FOR THE PRODUCTION OF WATER-DILUTABLE BINDERS BASED ON AIR-DRYING SHORT-OIL ALKYD RESINS

Water-soluble air-drying alkyd resins have long been known. According to French Pat. Specification No. 1,369,013, for example, they can be produced by reacting alkyd resins with quantities of anhydrides of polybasic carboxylic acids such that resins with acid numbers of more than 50 are formed. Although resins of this kind can also be air-drying, it is regarded as better, in view of their high acid numbers, to produce melamine-resin-crosslinking stoving lacquers from them (page 3, left-hand column, paragraph 3).

German Offenlegungsschrift No. 1,916,972 describes water-soluble, air-drying polyurethane resins which are distinguished by the fact that they are isocyanate-extended, fatty-acid-modified low molecular weight polyols. This variation is said to improve the bond strength of air-drying systems (page 10, paragraph 2). A complicated production process, comprising in all at least three different stages, is required to obtain this result, because first of all a preliminary product has to be produced, and the resulting resin must subsequently be extended with isocyanates and finally reacted with anhydrides. To obtain further improvement, modification with oil-reactive phenolic resins, such as butyl phenol resols, is also regarded as necessary, involving another process stage (cf. page 6, paragraph 3, and page 7, paragraphs 2 and 3). The polyurethane resins thus obtained increase the water up take of conventional alkyd resin systems (page 11, paragraph 2). In the case of mixtures of this kind with conventional alkyd resins, this can be a valuable property for lacquering spray-moist substrates, although in cases where binders of this kind are used as sole binders, this hydrophilic character is more of a disadvantage for protecting the substrate.

On the other hand, fully condensed alkyd resins have also been further extended through polyisocyanates in another process stage, and semiesters subsequently produced in order to obtain better air-drying systems (German Offenlegungsschrift No. 1,917,162).

Unfortunately, this measure is attended by the disadvantage that a reaction with isocyanates which is hard to carry out and difficult to keep consistent is again required for obtaining waterproof coatings.

Finally, when the changeover was made to short-oil water-soluble alkyd resins, it was found to be necessary, in addition to the isocyanate modification, to modify the fatty acids by reaction with phenolic resins, again with the object of improving the resistance to water of systems of this kind (Belgian Pat. No. 803,346).

It was therefore particularly surprising and by no means foreseeable that it should also be possible, by a particularly simple reaction involving only two stages, without any need for further complicated urethane modification, to obtain binders which yield thoroughly drying waterproof lacquer compositions with great reproducibility.

Accordingly, the present invention relates to a process for the production of water-dilutable binders based on air-drying short-oil alkyd resins acidified by semiester formation with dicarboxylic acid anhydrides which alkyd resins have acid numbers of from 30 to 70, preferably from 42 to 48, and hydroxyl numbers of from 40 to 120 and a content of natural unsaturated fatty acids in an amount of from 15 to 50, preferably 20 to 34% by weight and of a co-condensed natural-resin-modified phenol resol resin in an amount of from 2 to 10% by weight, characterised in that ) the molar composition of the alkyd resin before semiester formation corresponds to a polyalcohol/polycarboxylic acid (anhydride)/monocarboxylic acid ratio of 1:(0.5-1):(0.3-1), and 2) polyalcohols, polycarboxylic acids resp. their anhydrides, monocarboxylic acids and phenolic resins are co-condensed in a single process stage, followed only by semiester formation with dicarboxylic acid anhydrides.

By alkyd resins there are to be understood polycondensates produced by polycondensation of alcohols and carboxylic acids according to known methods of the kind defined in Rompp's Chemielexikon, Vol. 1, page 202, Franckh'sche Verlagsbuchhandlung Stuttgart, 1966 or described, for example, by D. H. Solomon, The Chemistry of Organic Film Formers, pages 75-101, J. Wiley & Sons Inc., New York, 1967.

Polyalcohols suitable for the preparation of the alkyd resins are aliphatic, cycloaliphatic and/or aromatic alcohols containing 1 to 6, preferably 1 to 4, hydroxyl groups attached to non-aromatic carbon atoms, glycols such as ethylene glycol, propylene glycol, butane diols; ether alcohols such as diethylene and triethylene glycols; oxethylated bisphenols, perhydrogenated bisphenols; trimethylolethane, trimethylolpropane, glycerol, pentaerythritol, dipentaerythritol, mannitol and sorbitol.

Acid components suitable for the preparation of the alkyd resins are aliphatic, cycloaliphatic saturated or unsaturated and/or aromatic polybasic carboxylic acids, preferably di-, tri- and tetrabasic carboxylic acids containing 4 to 12 carbon atoms per molecule and the esterificable derivatives thereof (e.g. anhydrides or esters) e.g. phthalic acid anhydride, isophthalic acid, terephthalic acid, tetrahydro- and hexahydrophthalic acid anhydride, trimellitic acid anhydride, pyromellitic acid anhydride, maleic acid anhydride, adipic acid and succinic acid as well as halogenated acids such as chlorophthalic acid and Het acid.

Monocarboxylic acids suitable for the preparation of the alkyd resins are aliphatic, cycloaliphatic saturated and unsaturated and/or aromatic monocarboxylic acids containing 6 to 24 carbon atoms per molecule such as benzoic acid, butylbenzoic acid, tolyl acid, hexahydrobenzoic acid, abietic acid as well as unsaturated natural fatty acids and esters thereof such as linseed oil, soya bean oil, wood oil, safflower oil, dehydrated castor oil and castor oil, cotton seed oil, ground nut oil, tall oil fatty acids, linseed oil fatty acid, the fatty acids of soya bean oil, of wood oil, of safflower oil and of castor oil and dehydrated castor oil and products obtained from natural unsaturated oils or fatty acids by conjugation on isomerisation. Suitable saturated fatty acids are, for example, coconut oil and α-ethylhexanoic acid.

The molecular weight destined as number average of the alkyd resins is from 1000 to 10,000, preferably from 1000 to 5000 (molecular weights below 5000 destined by vapour pressure osmosis in dioxane and acetone; if both values differ from each other the lower value is considered to be the more accurate one; molecular weights above 5000 destined by membrane osmosis in acetone).

Suitable natural-resin-modified phenolic resins are the reaction products of colophony and resols, optionally esterified with polyalcohols, which are known in the literature as Albertol. Resols are the phenolic resins which can be produced under acid conditions from phenol and formaldehyde (Hultzsch, Chemie der Phenolharze, Springer-Verlag 1960, pages 157 et seq).

Dicarboxylic acid anhydrides suitable for semiester formation are, for example, phthalic acid anhydride, succinic acid anhydride, maleic acid anhydride and preferably, tetrahydrophthalic acid anhydride.

Production is carried out exclusively on the simplified production principle of direct co-condensation with stirring in an inert gas atmosphere, of polyalcohols, carboxylic acids and phenol derivatives at reaction temperatures generally in the range of from 180° to 270° C, preferably in the range of from 240° to 250° C and more especially at a reaction temperature of 260° C. It may be assumed that the phenolic resin portions do not take part exclusively in the polycondensation reaction, but also interact through addition reactions with the double bonds of the unsaturated fatty acids. Reactions of this kind take place in accordance with the following model equations:

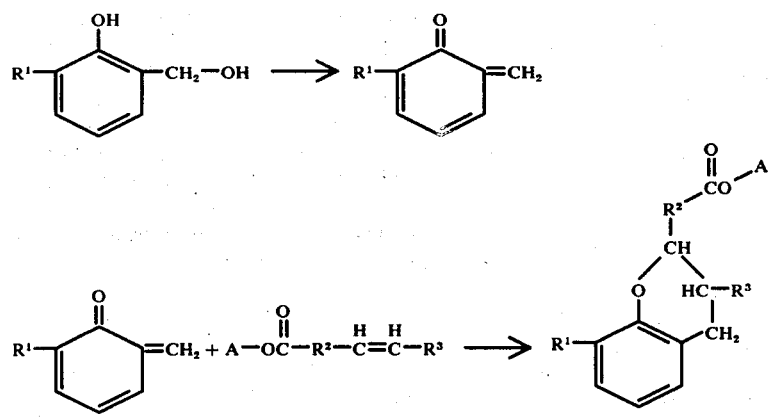

wherein
$R^1$ = radical of a natural-resin-modified phenolic resin
$R^2$ = aliphatic radical
$R^3$ = aliphatic radical
A = alkyd resin radical (A—OH = alkyd resin)

Chromane ring systems of this kind are then constituents, attached by condensation through carbon bonds, in the drying alkyd resin coating.

On completion of the reaction, the reaction mixture is normally cooled and the semiester is formed in the cooling phase at about 160° to 120° C by the addition of a dicarboxylic acid anhydride, preferably tetrahydrophthalic acid anhydride.

The free acid groups of the alkyd resins are usually completely neutralised by inorganic or organic bases. In many cases, however, the alkyd resins are sufficiently water-soluble if neutralised in an amount of 70 to 80%. Suitable bases are for example, ammonia, primary secondary and tertiary amines such as ethylamine, diethylamine, triethylamine, dimethylethanolamine, mono-, di- and triethanolamine, dimethylaminopropanol, and optionally alkali hydroxides.

The alkyd resins obtained according to the process of the invention which have been partly or completely neutralised can be mixed with water-dilutable organic auxiliary solvents such as, for example, monohydric alcohols such as ethanol, iso-propanol, butanols; ethyleneglycol monoalkyl esters such as ethyleneglycol monomethyl, monoethyl and monobutyl ester, ketones such as acetone, methyl ethyl ketone; ketoalcohols and cyclic alkyl esters such as tetrahydrofurane.

The binders obtained according to the process of the invention are extremely suitable as basis for primers protecting varnishes for metal surfaces. for metal surfaces.

The invention is illustrated by but by no means limited to the following Examples, in which the parts and percentages quoted are parts and percentages by weight.

EXAMPLE 1

An alkyd resin is produced from 1667 parts of linseed oil, 425 parts of pentaerythritol, 1000 parts of trimethylol propane, 185 parts of linseed oil fatty acid, 457 parts of benzoic acid, 1201 parts of phthalic acid anhydride and 15 parts of a natural-resin-modified phenolic resin having a melting range of from 118° to 130°C and an acid number of less than 20 (trade name Albertol 626L, product of the firm of Hoechst AG, Werk Albert), by polycondensation at 260° C until a resin with a viscosity corresponding to a time of outflow of 88 sec (70% in dimethyl formamide, destined according to DIN 53 211) is formed. The resin thus formed is subsequently converted into a polysemiester with an acid number of 45 by the addition of 464 parts of tetrahydrophthalic acid anhydride at 130° C. This alkyd resin with an oil content of fact 30% and a phenolic resin content of 2.8% is dissolved to form an 88% solution in ethylene glycol monobutyl ether, followed by the preparation of a water-dilutable commercial form of this solution. It has the following composition: finally 124.5 parts of the 88% solution,
5.0 parts of ethyl glycol,
45.0 parts of isopropanol,
8.8 parts of triethyl amine, and
16.7 parts of water.

A clear lacquer with the following recipe is prepared from this solution which has a binder content of 55%: 53.90 parts of the 55% commercial form, 44.90 parts of water, and 1.20 parts of Co-Pb-Mn-naphthenate solution (1:2 in xylene with a metal content of 1.5% of Co, 22% of Pb, 1.5% of Mn) 100.00 parts Lacquers containing these binders show favourable drying behaviour, dry out thoroughly and give surprisingly waterproof elastic lacquer coatings of high bond strength.

EXAMPLE 2

The lacquers mentioned in the following Table were tested as clear lacquers in accordance with Example 1. The drying test on glass plates produced the following results:

| Binder | Binder according to the invention (Example 1) | Isocyanate-modified binder according to DT-OS, 1,917,162 | Isocyanate- and phenolic-resin-modified alkyd resin according to BE-PS 803,346 |
| --- | --- | --- | --- |
| oil content | 30 % | 50 % | 24% |
| drying time in hours at room temperature | 7 h | 5.5 h | 5 h |
| complete drying after 24 hours | 0- | 0- | 0 |
| water resistance after 24 hours wad test | 1 h without any change | 1.5 h without any change | 1 h without any change |

The Comparison Test shows that, even in the absence of the isocyanate modification which necessitates additional process stages, it is possible to obtain valuable water-dilutable lacquers which give good lacquer finishes. Accordingly, the Examples corresponding to the closest prior art were selected from the known patent literature. The differences in individual values are attributable to the fact that comparable binders with the same oil contents were not described as Examples in every case.

The Comparison Test with the isocyanate-modified or isocyanate-and phenolic-resin-modified alkyd resins produced by the multistage process shows that it is possible, by using the more easily produced isocyanate-free phenolic-resin-modified alkyd resins according to the invention, to obtain equivalent lacquer finishes, even without isocyanate modification, by keeping to the process stages according to the invention.

We claim:
1. A water-dilutable binder based on an air-drying short-oil alkyd resin which is essentially free of urethane groups and contains natural, unsaturated fatty acids in an amount of from 15 to 50% by weight, said binder having been prepared by
   a. co-condensing in a single process stage
      i. 2 to 10% by weight, of natural-resin-modified phenol resol resin and
      ii. 90 to 98% by weight, of a mixture of a polyalcohol, a polycarboxylic acid or its anhydride and a monocarboxylic acid, the molar ratio of polyalcohol to polycarboxylic acid or anhydride to monocarboxylic acid being 1 to 0.5-1 to 0.3-1, until an alkyd resin with an acid number of from 30 to 70 and an OH number of from 40 to 120 is formed and
   b. acidifying said alkyd resin by semiester formation with a dicarboxylic acid anhydride.

* * * * *